June 23, 1925.

J. R. FLEMING

JOURNAL BOX

Filed Nov. 6, 1922

1,542,998

Inventor
JAMES R. FLEMING.
By his Attorney

Patented June 23, 1925.

1,542,998

UNITED STATES PATENT OFFICE.

JAMES R. FLEMING, OF SCRANTON, PENNSYLVANIA.

JOURNAL BOX.

Application filed November 6, 1922. Serial No. 599,242.

*To all whom it may concern:*

Be it known that I, JAMES R. FLEMING, a citizen of the United States, and a resident of Scranton, in the county of Lackawanna and State of Pennsylvania, have invented certain new and useful Improvements in a Journal Box, of which the following is a specification.

Among the principal objects which the present invention has in view are: to avoid wear of the said box and the hub of the wheel; to relieve friction upon the hub of the wheel and the relatively stationary portion of the box; to reserve the alinement of the parts; to provide a simplified means for lubricating and adjusting the hub and box; and to provide simple means for removing the roller bearings from journal boxes where the said bearings are used.

*Drawings.*

*Description.*

Figure 1:
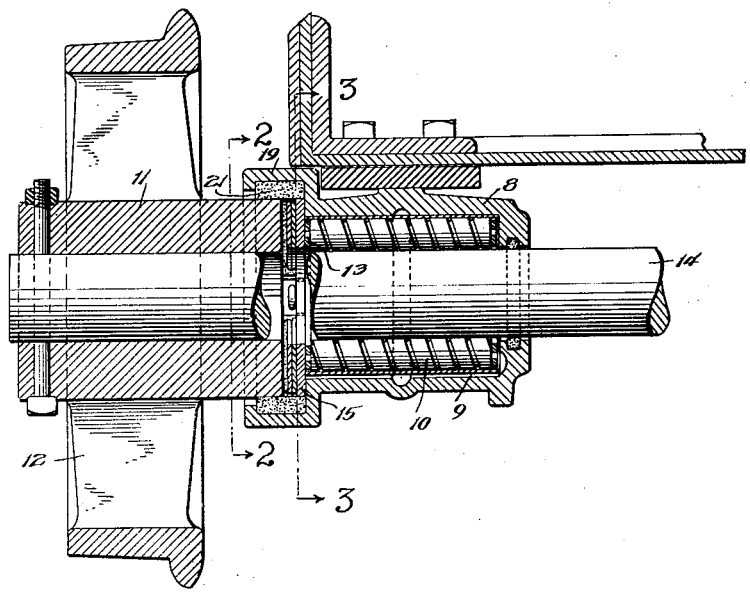
Figure 1 is a vertical section of a car wheel of the type usually employed in mining cars, a fragment of the car body, and a box connecting said wheel and body, said box being constructed and arranged in accordance with the present invention.
Figure 2:
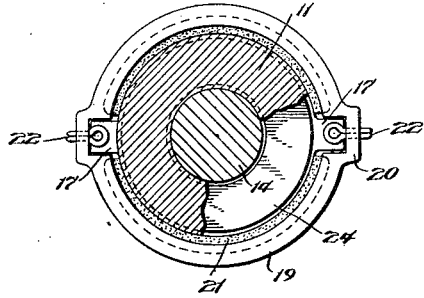
Figure 2 is a cross section taken as on the line 2—2 in Fig. 1.

Heretofore, journal boxes equipped with roller bearings have been provided with an inturned flange adjacent the car wheel perforated to pass the axle and to approximately fit the same. Means such as a washer has been employed for disposition between the hub of the wheel and the exposed end of the box. The construction has, however, proved inconvenient, particularly where the wheel is outside the journal box and when it is desired to remove the roller bearing. When employing the older construction it was necessary to first remove the wheel, then the axle and the cap at the inner end of the journal box which covers the roller bearing.

To avoid this inconvenience, the present box body 8 is constructed without the interior flange leaving the end of the chamber 9 wherein the roller bearing 10 is mounted open adjacent the hub 11 of the wheel 12. The bearings 10 are held in position by a washer 13 which snugly fits the cylinder 9 but provides a slight clearance for the axle 14.

Figure 3:
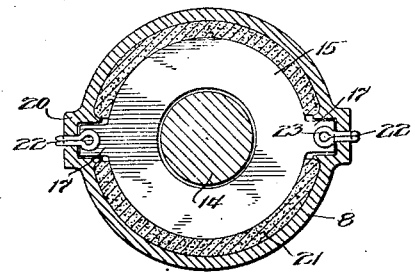
Figure 3 is a cross section taken as on the line 3—3 in Fig. 1.

The washer 13 is loose to rove or revolve with any of the parts with which it frictionally engages. The washer 13 is interposed between the roller bearings 10 and the wear plate 15 with which the box is provided. The plate 15 as best shown in Fig. 3 of the drawings is circular in form having a central opening 16 for the pre-passage of the axle 14. The plate 15 is preferably provided with two lugs 17 oppositely disposed, which in service, rest in recesses 18. To form the recesses 18 the collar 19 has one or more extensions 20, which provide the necessary metal for forming the said recesses.

The collar 19 has an interior annular groove for holding the dust packing 21. The packing 21 extends around the plate 15 which serves to support the inner edge of the said packing and hold it snugly in position.

To hold the plate 15 in position, I provide preferably cotter pins 22, the heads 23 of which rest inside the journal structure and in the path of the lugs 17. These heads serve to prevent the dislocation of the plates 15 when in service or when for any reason the journal box or wheel are being removed from the axle. The ends of the cotter pins are turned down as seen best in Fig. 3 and so serve a handy and convenient purpose as they may be easily straightened and driven out of engagement with the wall of the extension 20 to permit the withdrawal of the plate 15.

As seen best in Fig. 1 of the drawings the end of the hub 11 enters the collar 19 and supports therein the packing 21. The light washers 24 shown in the drawings are provided for supplementing the plate 15 and to reduce the friction and wear incident thereto when the end of the hub 11 engages the washers.

The roller bearings 10 are suitably lubricated. The lubricant supplied to the said roller bearing overflows the chamber 9 passing between the edges of the washer 13, the plate 15, and the washers 24, and the axle 14. The lubricant in passing enters the spaces between the various members mentioned and ultimately soaks into the packing 21 to maintain the lubricating efficiency, thereof.

From the foregoing it is obvious that when a journal box constructed and arranged in accordance with the present invention is in service, the roller bearing 10 may be readily removed from the journal box either for repair or replacement, this being accomplished by merely removing the wheel 12 after having relieved the axle at this point from the load, then successively removing the washers 24 to expose the plate 15. The cotter pins 22 being straightened and removed from engagement with the extension 20, the said plate 15 may be drawn away from to provide for the easy removal of the washer 13 and the said bearings which may then be drawn from the box.

It is obvious that if in service the hub 11 of the wheel engages the washers 24, any wear incident to the engagement is borne by the said washers and the plate 15. At the same time it will be seen that the plate 15 when locked in position by the cotter pins 22 prevents the bearing 10 from being disadjusted as an incident to the lateral vibration or movement of the vehicle.

*Claims.*

1. In a journal box having an open ended body an enlarged annular pocket formed on one end thereof, a bearing in said body, a centrally perforated wear plate disposed over the end of said body in said pocket, opposed recesses formed in the walls of said pocket, and extensions on said plate engaged in said recesses for preventing rotation of said plate, and plate anchoring means in the walls of said pocket at one side of said plate.

2. In a journal box provided with an open ended body, an enlargement on one end thereof shaped to form an open annular pocket, the walls of said pocket being provided with diametrically opposed sockets, a roller bearing assembly in said body, a wear plate disposed in said pocket over the open end of said body, integral extensions on said plate engaged in said sockets for positioning said plate, and plate retaining pins extended through the walls of said sockets in advance of the plate extensions for anchoring said plate.

JAMES R. FLEMING.